United States Patent [19]
McDaniel et al.

[11] Patent Number: 4,877,763
[45] Date of Patent: Oct. 31, 1989

[54] SUPPORTED CHROMIUM OXIDE/BORON CATALYST

[75] Inventors: Max P. McDaniel; James N. Short, both of Bartlesville, Okla.

[73] Assignee: Williams, Phillips & Umphlett, Bartlesville, Okla.

[21] Appl. No.: 252,310

[22] Filed: Oct. 3, 1988

Related U.S. Application Data

[60] Division of Ser. No. 38,386, Apr. 15, 1987, Pat. No. 4,818,800, which is a continuation-in-part of Ser. No. 759,984, Jul. 29, 1985, abandoned, which is a division of Ser. No. 613,938, May 25, 1984, abandoned.

[51] Int. Cl.⁴ .......................... C08F 2/14; C08F 4/18; C08F 10/02
[52] U.S. Cl. .................................. 502/117; 502/107; 502/113; 502/154
[58] Field of Search ................ 502/117, 113, 107, 154

[56] References Cited

U.S. PATENT DOCUMENTS

| | | | |
|---|---|---|---|
| 2,781,408 | 2/1957 | Witt et al. | 526/106 X |
| 3,484,428 | 12/1969 | Kallenbach | 526/106 |
| 3,780,011 | 12/1973 | Pullukat et al. | 526/106 |
| 3,947,433 | 3/1976 | Witt | 526/106 |
| 4,081,407 | 3/1978 | Short et al. | 526/106 |
| 4,118,340 | 10/1978 | Rekers | 526/106 |
| 4,173,548 | 11/1979 | Pullukat et al. | 526/106 |
| 4,303,770 | 12/1981 | Pullukat et al. | 526/106 X |
| 4,312,967 | 1/1982 | Norwood et al. | 526/106 X |
| 4,364,839 | 12/1982 | McDaniel et al. | 526/106 |
| 4,364,840 | 12/1982 | McDaniel et al. | 526/106 X |
| 4,364,841 | 12/1982 | McDaniel et al. | 526/352 |
| 4,364,842 | 12/1982 | McDaniel et al. | 526/352 |
| 4,364,855 | 12/1982 | McDaniel et al. | 526/352 |
| 4,735,931 | 4/1988 | McDaniel et al. | 502/117 |

Primary Examiner—Paul E. Konopka
Attorney, Agent, or Firm—Beverly M. Dollar

[57] ABSTRACT

A catalyst system useful for the polymerization of ethylene and other α-olefins comprising (a) a silica-supported chromium oxide catalyst and (b) a dihydrocarbylboron monohydrocarbyloxide adjuvant. The catalyst system results in α-olefin polymers having a broadened molecular weight distribution in the high molecular portion.

15 Claims, 3 Drawing Sheets

SEC CURVES OF POLYETHYLENES

A — 3.6 PPM ETHYL BORON DIETHOXIDE

B — 1.8 PPM ETHYL BORON DIETHOXIDE
← INCREASING MW

C — NO ADDITIVE

ETHYL BORON DIETHOXIDE DID NOT SEEM TO AFFECT SEC TRACES

SUPPORTED CHROMIUM OXIDE/BORON CATALYST

This is a divisional of copending application Ser. No. 038,386, filed Apr. 15, 1987, now allowed, which in turn is a continuation-in-part of copending application Ser. No. 759,984, filed July 29, 1985, now abandoned, which in turn is a divisional application of Ser. No. 613,938, filed May 25, 1984, now abandoned.

FIELD OF THE INVENTION

The invention pertains to an olefin polymerization process. In another aspect, the invention pertains to a catalyst. In a further aspect, the invention pertains to an adjuvant/catalyst combination.

In another aspect, the invention pertains to olefin polymers of broadened molecular weight distribution of the high molecular weight proportion.

BACKGROUND OF THE INVENTION

Supported chromium oxide catalysts have been employed to prepare various poly($\alpha$-olefin)s having good character for many purposes. Supported chromium oxide catalysts are used to prepare, for example, molding grade poly($\alpha$-olefin)s by means of a slurry polymerization system in which the polymers are produced in the form of small particles suspended in a hydrocarbon diluent. Among the supports employed for the supported chromium oxide catalysts have been silica alone or in combination with titania.

In the past, boron compounds have been employed in combination with the silica-supported chromium catalysts, such as the boranes and alkylboranes or boron hydrides as described in U.S. Pat. No. 3,484,428 (Kallenbach, Dec. 16, 1969).

The use of borane compounds with silica-supported chromium oxide catalyst is known, such as described in U.S. Pat. No. 3,947,433 (Witt, Mar. 30, 1976), producing a high shear response polymer. However, some undesirable side effects have shown up. For example, the use of trialkylborane as an adjuvant with silica-supported chrome oxide catalysts in ethylene homopolymerizations has been found to promote the formation of small, but significant and uncontrollable, amounts of monomers such as 1-butene, 1-hexene, and 1-octene, which then copolymerize along with the ethylene, resulting in a lowering of the normal natural polymer density which would have been achieved as a strictly homopolymer, and making very difficult the control of uniform polymer density consistently in a process.

Other supports employed with the chromium catalysts include aluminum phosphate-containing bases, activated phosphate-containing supports, phosphated silica-containing bases, and aluminum orthophosphate/silica combinations, U.S. Pat. Nos. 4,364,839, 4,364,840, 4,364,841, 4,364,842, and 4,364,855 (McDaniel and Johnson, Dec. 21, 1982). These patents describe the use of boranes, and boron alkoxides such as diethylboron mono-ethoxide, as cocatalysts with the aluminum phosphate-supported chromium catalysts.

The dialkylboron monoalkoxides behave in about the same manner as do the boranes when used with aluminum phosphate-supported chromium oxide catalysts in polymerization systems, tending to increase the density of the resulting polymer, increase melt index, and broadening the molecular weight distribution on the low molecular weight side. The trialkylboranes with AlPO$_4$-supported chromium oxides also increase the molecular weight distribution toward the low molecular weight side. Broadening of the low molecular side of the molecular weight distribution is a result not always desirable when a broader molecular weight distribution ethylene or other $\alpha$-olefin polymer is desired due to undesirable molding characteristics.

A catalyst system which overcomes the above difficulties and which works well in $\alpha$-olefin polymerizations is highly desired.

BRIEF DESCRIPTION OF THE INVENTION

Unexpectedly, we have discovered that the use of dihydrocarbylboron monohydrocarbyloxide adjuvants with silica-based supported chromium oxide catalysts surprisingly has very differing effects in the polymer characteristics than would have been expected in the face of the prior art.

When used with the silica-supported chromium oxide catalysts, the dihydrocarbylboron monohydrocarbyloxide adjuvants act very differently from monohydrocarbylboron dihydrocarbyloxide adjuvants.

The dihydrocarbyl boronmonohydrocarbyloxide adjuvants maintain or decrease the density of the polymer; decrease the melt index; and quite unexpectedly broaden the high molecular weight side of the molecular weight distribution, not the low molecular weight side. These effects are quite the opposite from results which would have been expected from the teachings of the prior art. According to the prior art, monohydrocarbylboron dihydrocarbyloxide and dihydrocarbylboron monohydrocarbyloxide adjuvants would have expected to be about the same as the boranes, known for use with the silica-supported chromium oxide catalysts. And, the monohydrocarbylboron dihydrocarbyloxides do function about that way.

Most unexpectedly, the dihydrocarbylboron monohydrocarbyloxide adjuvants when used with silica-supported chromium oxide catalysts function to produce results quite different from their chemical cousins. The dihydrocarbylboron monohydrocarbyloxide adjuvants produce results which are highly desirable, improving the properties of the resulting polymers, and without the side effects caused by promoting formation of undesirable monoolefins. The polymers produced in accordance with our invention have low melt indexes (MI), high shear responses, and broadened molecular weight distributions, particularly on the high molecular weight side.

BRIEF DESCRIPTION OF THE DRAWINGS

The Drawings are SEC (Size Exclusion Chromatography) curves of polymers described in more detail in Example IV herein.

OBJECTS OF THE INVENTION

Figure 1:
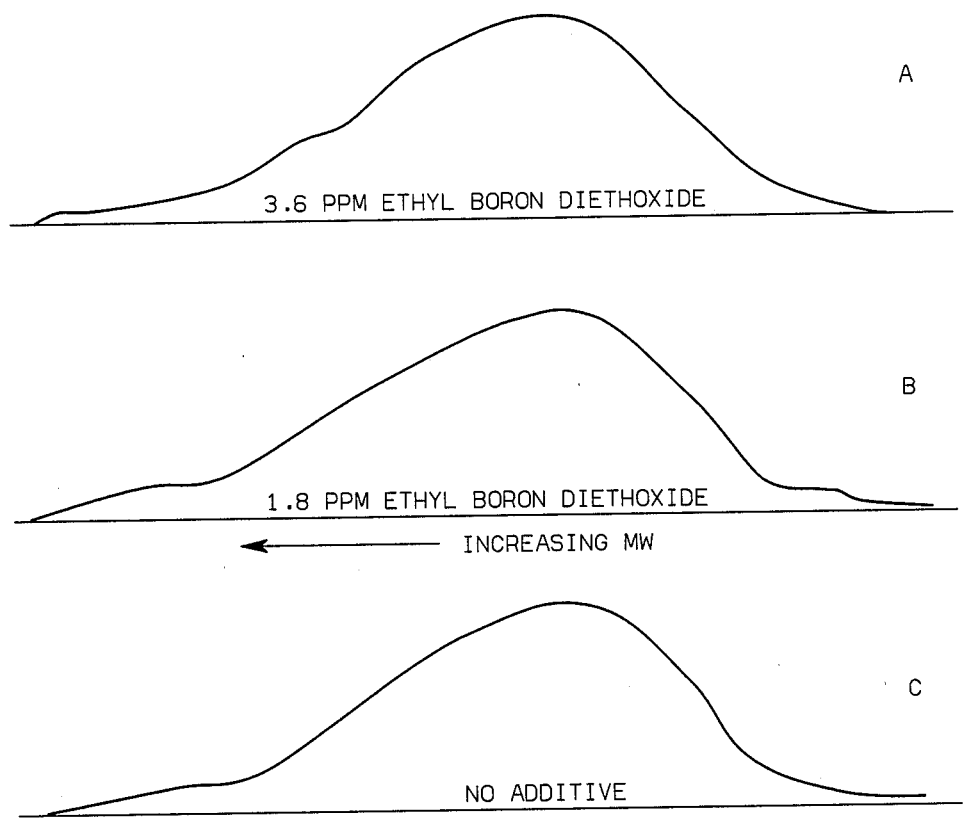
FIG. 1 shows these SEC curves for polyethylenes prepared with a silica-supported chromium oxide catalyst. Curve C is for a polyethylene prepared from the silica-supported chromium oxide catalyst without adjuvant. Curves A and B are for polyethylenes produced under the same conditions using the same supported catalyst, but with two levels of ethyl boron diethoxide (EBDE). No particular effect on molecular weight distribution was observed.

An object of our invention is to provide a catalyst system comprising a catalyst and adjuvant capable of giving a readily processable polymer having a broadened molecular weight distribution, particularly in the high molecular weight portion, without lowering substantially the desired density of the polymer.

It is a further object of our invention to provide poly-($\alpha$-olefin)s of a broadened molecular weight distribution, particularly on the high molecular weight side, without lowering substantially the normal density of the polymer.

Another object of our invention is a novel catalyst adjuvant system comprising a silica-supported chromium oxide catalyst with a dihydrocarbylboron monohydrocarbyloxide adjuvant.

A further object of our invention is a polymerization system for $\alpha$-olefins using the catalyst/adjuvant system.

Other aspects, objects, and advantages of our invention will become apparent from the specification, including examples and appended claims.

Supports

Suitable silica supports for the supported chromium oxide catalysts include silica, silica-alumina, silica-titania, silica-alumina-titania, alone, or in admixture or combination. The supports can be prepared and subsequently impregnated with the chromium compound or compounds, using techniques known in the art.

The supports can be prepared, for example, by precipitation or coprecipitation techniques, or by mixing silica or silicates with appropriate refractory materials including alumina or titania, to prepare suitable particulates. Alumina and/or titania can be coprecipitated with the silica. Silica/alumina/titania supports can be coprecipitated. Silica or silica-alumina supports can be impregnated with a titanium compound prior to activation.

Preferably, silica constitutes a major portion of the support, e.g., about 80 to 100 weight percent silica with alumina and/or titania or both making up minor proportion of the support. The proportion of titanium combined with the silica support, when used, can be varied, but generally is in the range of about 0.1 to 10, preferably about 0.5 to 5, weight percent as titanium oxide based on the weight of the dry composite (or silica plus titanium oxide). The support subsequently can be impregnated as a dry support with a chromium compound, preferably nonaqueously.

A presently preferred support is a hydrogel, cogel, or tergel, as described in U.S. Pat. No. 4,081,407 (Short and Witt, Mar. 28, 1978), incorporated herein by reference. Exemplary of the silica-based hydrogels are silica, silica-alumina, silica-chromia, silica-magnesia, silica-titania, silica-zirconia, silica-chromia-titania, and the like.

The silica-containing hydrogels preferably are formed by introducing an aqueous solution of a silicate compound or compounds, such as sodium silicate, potassium silicate, and lithium silicate, into an aqueous solution of an acid such as a carboxylic acid, mineral acid, acid salt, e.g., ammonium sulfate and carbon dioxide, under conditions suitable for forming a hydrogel. In making the cogels and tergels, a suitable amount of an appropriate water-soluble salt of a catalytic or promoting nature can be incorporated in either the silicate solution or the acid solution. For example, the acid solution can contain chromium trioxide, chromium nitrate, and the like and combinations thereof.

The resulting hydrogel preferably is aged for at least one hour at an elevated temperature, i.e., 60° C.–95° C., after which soluble impurities such as sodium sulfate, etc., are washed out by exchange with a dilute aqueous solution of ammonium nitrate as is known in the art. Generally, the amount of intefering ion or ions is less than about 0.1 weight percent based on the dry weight of the gel following the treatment. The treated hydrogel can be further washed with distilled water or deionized water, if desired.

The purified hydrogel is then treated for removal of water by azeotropic distillation with a saturated, aliphatic alcohol selected from 1-pentanol, 2-pentanol, 3-methyl-1-butanol, 4-methyl-2-pentanol, 2,2-dimethyl-1-propanol, and 1-hexanol. Following the alcohol treatment, the treated gel is recovered and the alcohol removed by evaporation, flashing, etc.

Alternatively, a silica hydrogel, after aging and washing to remove soluble impurities, can be impregnated with an aqueous solution of the desired chromium agent or agents, such as chromium acetate, prior to the alcohol treatment.

The addition of a chromium compound to the dried gel can be accomplished, if desired, by impregnation with a nonaqueous solution of a chromium compound, for example by a hydrocarbon solution of such as t-butyl chromate. The dry product after the alcohol treatment and the impregnation with a nonaqueous solution of a chromium compound is calcined in a substantially dry, molecular oxygen-containing gas such as air so that at least a portion of the chromium is in the hexavalent state. The recovered product is then employed in the polymerization process.

Chromium Compounds

The chromium compound employed for impregnation can be a water-soluble or dispersible inorganic compound such as chromium nitrate, ammonium chromate, chromium trioxide, and the like dispersed or dissolved in water; or can be an organic chromium compound such as tert-butyl chromate, chromium acetylacetonate, chromium acetate, and the like, dissolved in a non-aqueous solvent such as n-pentane, n-hexane, benzene, acetone, and the like. The solution or dispersion is added to the dry support in suitable amount.

The support is admixed with the chromium compound to obtain about 0.1 to 10, preferably about 1, weight percent chromium (calculated as chromium) based on the total weight of the finished catalyst, i.e., the total of the dry silica-containing support plus the chromium oxides after activation.

If the aqueous chromium compound is added to the dry support, it can decrease the pore size and pore volume, which can affect polymer MI, etc. If the support has a large pore volume, e.g. about 1.8 g/cc or larger, it is preferred to add the chromium nonaqueously to it so as to avoid damaging the pores.

The resulting mixture is dried and activated in dry air at an elevated temperature, generally within the range of about 500° F. to 2,000° F. (260° C. to 1090° C.), preferably about 750° F. to 1,600° F. (400° C. to 871° C.), for about one-half hour to 50 hours, preferably about 1 to 10 hours. At least a substantial portion of the chromium in low valence states is converted thereby to the hexavalent form in this process. The chromium is present, of course, substantially as an oxide.

Dihydrocarbylboron Monohydrocarbyloxide Adjuvants

Dihydrocarbylboron monohydrocarbyloxide adjuvants are used in our invention. Presently preferred are those represented by the formula:

$$R_2BOR$$

in which each R is independently selected from a $C_1$ to $C_{15}$ hydrocarbyl radical, such as alkyl, cycloalkyl, and aryl, and combinations, preferably a $C_1$ to $C_8$ alkyl radical, with ethyl presently being most preferred. Mixtures can be employed.

The dihydrocarbylboron monohydrocarbyloxides can be prepared by reacting a hydrocarbon solution of a trihydrocarbylboron with a hydrocarbon solution of an alcohol at about a 1:1 molar ratio.

Exemplary species of dihydrocarbylboron monohydrocarbyloxide adjuvants include: dimethylboron ethoxide, diethylboron ethoxide (preferred), di-n-octylboron n-butoxide, diphenylboron phenoxide, dicyclohexylboron ethoxide, and dipentadecylboron n-heptyloxide.

Trihydrocarbylborane Adjuncts

In some instances, such as when it is desired to increase catalyst productivity while maintaining high polymer density and decreasing polymer melt index, it may be useful to use as a coadjuvant at least one trihydrocarbylborane along with the dihydrocarbylboron monohydrocarbyloxide adjuvants. The trihydrocarbylboranes can be represented by the formula:

$$BR_3$$

wherein each R is as described above, with ethyl being presently most preferred for availability and convenience. Exemplary species include trimethylborane, triethylborane, triphenylborane, and tri-t-butylborane.

Ratio of Chromium to Boron

In our catalyst/adjuvant system employing a boron-containing adjuvant, the amount of boron adjuvant employed should be sufficient to given an atom ratio of boron:chromium within the range of about 0.3:1 to 10:1, presently preferably about 0.5:1 to 7:1.

The total amount of organoboron compound(s)/adjuvant(s) employed, e.g. a dihydrocarbylboron monohydrocarbyloxide alone or in combination with a trihydrocarbylborane, can be expressed in three different ways. That is, (a) The amount of organoboron compound(s) can be given in terms of weight percent organoboron compound(s) based on weight of boron compound plus weight of catalyst (the silica supported chromium) ranging from about 5 to 70, preferably about 10 to 60, weight percent. (b) In terms of ppm organoboron compound(s) based on diluent employed in slurry polymerization, the ranges given above are equivalent to about 0.5 to about 18 ppm, preferably about 1 to 12 ppm. (c) In terms of atom ratio of boron to chromium, the ranges given above are equivalent to about 0.3 to 10, preferably about 0.5 to 7.

When a dihydrocarbylboron monohydrocarbyloxide is used in combination with a trihydrocarbylborane, the weight ratio of $R_2BOR$ to $BR_3$ can vary from about 1:4 to 4:1, preferably about 1:2 to 2:1.

The boron-containing adjuvant or adjuvants preferably are contacted with the chromium-containing supported catalyst in the reactor means prior to introduction therein of the α-olefin monomer or monomers. A preferred embodiment of this invention utilizes a common entry conduit as a part of the reactor means for the commingling of a supported chromium oxide catalyst stream in a diluent and the adjuvant stream in a diluent, and introducing the monomer by a separate conduit into the reactor. This is particularly desirable in a continuous polymerization process.

The supported chromium oxide component of the catalyst system of this invention can be further treated in similar manner as are other silica-supported chromium oxide catalyst, such as being fluorided, reduced and reoxidized, e.g. high temperature treatment in carbon monoxide followed by activation or reoxidation or the like, e.g. high temperature treatment in a molecular oxygen-containing ambient. These are known steps in the art. As shown by Control Example 2, even moderate heating to remove solvent is harmful to the dihydrocarbylboron hydrocarbyloxide component; hence, no high temperature treatment can be employed after the catalyst and adjuvant are combined.

Monomers

The catalyst/adjuvant system of this invention can be used to polymerize aliphatic α-olefins (1-olefins), such as of 2 to 8 carbon atoms per molecule, such as ethylene, propylene, 1-butene, 1-pentene, 1-hexene, 1-octene, and other higher a-olefins, alone, and in mixtures. The process is particularly useful for the polymerization of (a) ethylene or (b) ethylene and one or more comonomers selected from 1-olefins (1-monoolefins) containing 3 to 8 carbon atoms per molecule.

Ethylene copolymers preferably constitute at least about 90, preferably 96 to 99.7 weight percent polymerized ethylene units and 0.3 to 10, preferably 0.3 to 4 weight percent comonomer. Propylene, 1-butene, 1-pentene, 1-hexene, and 1-octene are especially preferred comonomers.

Polymerization System

The polymers can be prepared from the catalyst/adjuvant combinations of our invention by solution polymerization, slurry polymerization, and gas phase polymerization techniques, using conventional equipment and contacting processes. Contacting of the monomer or monomers with the catalyst and adjuvant can be effected by any manner known in the art of employment of solid catalysts. One convenient method is to suspend the silica-supported catalyst in an organic medium (diluent) and to agitate the mixture to maintain the silica-supported catalyst in suspension throughout the polymerization process. Other known contacting methods such as fluidized bed, gravitating bed, and fixed bed also can be employed.

The organic medium (diluent) employed generally is a paraffin and/or cycloparaffin of 3 to 12 carbon atoms per molecule, such as propane, n-butane, isobutane, n-pentane, isopentane, cyclohexane, n-dodecane, methylcyclohexane, and mixtures thereof.

The catalyst and adjuvant system of our invention is particularly suitable for use in slurry polymerization systems to produce fractional melt index polymers. Control of melt flow can be obtained by leeway in temperature control, by the known effect of higher catalyst activation temperature which causes the melt index of the resulting polymer to be higher, and/or by the use of hydrogen in the reactor.

Into the polymerization reactor is placed a hydrocarbon diluent, the silica-supported chromium oxide catalyst is added thereto, followed by the organoboron adjuvant, and then the appropriate monomer(s) is introduced to commence the polymerization reaction. Thereafter, in a continuous process, the silica-supported chromium catalyst, the boron-containing adjuvant or adjuvants, and the monomer, are added at suitable points in the process for a continuous process.

The presently preferred process polymerizes the monomer(s) to form a polymer as a slurry or particle form in a loop reactor, through other systems can be employed. In the particle form process, the polymer formed is substantially insoluble in the diluent.

With slurry polymerization of ethylene and predominantly ethylene copolymer systems to produce polymers in particle form, the temperature range generally is about 150° F. to 230° F. (65° C. to 110° C.). Heretofore, in order to get the highest possible melt index, commercial systems generally have been operated run as close to the maximum (i.e., the point polymer goes into solution) as possible, i.e. 225° F.±5° F. (107° C.±3° C.). The catalyst and adjuvant combinations of this invention, however, permit operating at the low end of the conventional polymerization temperature range, i.e., 205° F.±5° F. (96° C.±3° C.) in systems normally employing 225° F. (107° C.). The lower temperatures give a relatively higher monomer partial pressure, thus giving higher activity.

When hydrogen is used, it generally is used at partial pressures up to about 120 psia (0.8 MPa), preferably within the range of about 20 to 70 psia (0.01 to 0.48 MPa). Hydrogen accomplishes some control of polymer molecular weight, e.g. decreases molecular weight. This allows some control of polymer molecular weight as reflected by melt index (MI) or high load melt index (HLMI) of the polymer (the higher the value the lower the molecular weight).

Applications

Our catalyst/adjuvant combinations enable production of polymers for a wide variety of applications. Some applications, e.g. bottles, given good results when blow molded from polymer having a MI of about 0.3, for example. Larger articles, e.g. garbage cans, are generally made from polymer having a MI of about 20 to 30. Tough film can be made from polymer having a HLMI of about 5 to 15, for example.

Examples

Examples are provided to assist one skilled in the art, without intending that particular species, ratios, conditions, and the like, be limiting, but rather to assist in a further understanding of the invention.

Example I

A series of ethylene polymerization runs was made employing a commercially available chromium-impregnated silica-titania cogel catalyst having a nominal Ti content of about 2 weight percent and impregnated with sufficient chromium compound, e.g., $CrO_3$, $Cr(O_2C_2H_3)_3$, to provide a nominal 1 weight percent Cr, based on the weight of the final dry catalyst. Cogel is described in U.S. Pat. No. 4,081,407 (Short and Witt) col. 3 line 56+. The catalysts were activated prior to polymerization by calcination in a fluidized bed with dry air for about 3 hours at the temperatures indicated in the Tables. The Cr in the activated catalysts is at least partially in the hexavalent state.

The polymerization runs were made in a clean, dry, air-free 2 L stirred stainless steel reactor containing about 600 g of isobutane as diluent with a weighed amount of catalyst, each portion weighing about 50 mg.

The reactor containing diluent and silica-titania chromium catalyst was heated to the desired operating temperature, the organic boron compound(s)/adjuvant(s) added in the form of dilute hydrocarbon solutions sufficient to provide the specified amount of boron compound expressed as ppm based on the diluent, and ethylene was pressured in to give a reactor pressure of about 565 psia (3.9 MPa). Reactor pressure was maintained by supplying additional ethylene as needed from a pressurized reservoir. Each run was conducted for a time estimated to yield about 4,000 g polymer per g silica-supported chromium oxide catalyst.

Each run was terminated by stopping the ethylene flow and venting the gaseous contents of the reactor to a disposal line. The recovered polymer was dried and weighed to determine actual catalyst productivity expressed in terms of grams polyethylene per gram of solid catalyst.

The melt index (MI), expressed as g/10 minutes, of each polymer was determined in accordance with ASTM D 1238-65T, Condition E. Similarly, the high load melt index (HLMI), g/10 minutes, was determined in accordance with ASTM D 1238-65T, Condition F. Densities, g/cc, were determined in accordance with ASTM D 1505-68.

The heterogeneity index (HI), the ratio of weight average molecular weight divided by the number averag molecular weight, was determined from the values obtained from size exclusion chromatography (SEC). As the HI increases, this represents a broadening molecular weight distribution of a polymer.

The organic boron compound employed as adjuvant in the various runs was diethylboron ethoxide (DEBE) supplied to the reactor as a 1 weight percent solution in a mixture of n-hexane and n-pentane. The DEBE boron compound was obtained as a commercially available 10 weight percent solution in n-hexane which was further diluted with n-pentane to the 1 weight percent level.

Each run was conducted at 220° F. (104° C.). The MI values given are adjusted to a common 4,000 g/g solid silica-supported chromium oxide catalyst productivity based on correlations between MI and productivity as noted in U.S. Pat. No. 4,151,122 col. 7 line 68 to col. 8 line 1 for a common 4,000 g/g solid catalyst productivity.

The conditions employed and results obtained are set forth in Table I:

be between 15 and 21 ppm, perhaps about 18 ppm as an estimate.

Example II (Comparative)

TABLE I

Ethylene Polymerization, DEBE Adjuvant

| Run No. | Catalyst Act. Temp. °C. | Catalyst Weight mg | DEBE ppm | Ind. Time min.(a) | Run Time min.(b) | Catalyst Productivity g/g cat. | Adjusted MI g/10 min. | Density g/cc | HI |
|---|---|---|---|---|---|---|---|---|---|
| 1 | 760 | 50.5 | 0 | 50 | 50 (49) | 4080 | 0.52 | 0.9620 | 12 |
| 2 | 760 | 50.0 | 2.5 | 42 | 70 (60) | 4700 | 0.26 | 0.9615 | 14 |
| 3 | 760 | 48.0 | 5.0 | 28 | 125 (94) | 5310 | 0.18 | 0.9608 | 17 |
| 4 | 760 | 51.0 | 10 | 28 | 90 (78) | 4605 | 0.11 | 0.9622 | 19 |
| 5 | 760 | 50.0 | 15 | 90 | no go(c) | 640 | —(d) | — | — |
| 6 | 760 | 50.5 | 15 | 120 | no go | 792 | 0.02 | 0.9633 | 35 |
| 7 | 871 | 48.5 | 15 | 40 | 70 (64) | 4400 | 4.2(e) | 0.9634 | 29 |
| 8 | 871 | 48.0 | 21 | dead | — | — | — | — | — |

(a)Indicated time in minutes in which no apparent reaction has yet begun.
(b)The run times in parentheses are calculated run times adjusted to a productivity level of 4,000 g/g solid catalyst assuming a linear catalyst activity response over the actual run times. For example, in Run 2, the calculated run time is determined by 4,000 g polymer times 70 minutes divided by 4,700 g polymer to obtain 60 minutes.
(c)Catalyst not operative under conditions used.
(d)A "—" indicates not determined or not possible to determine.
(e)HLMI value; MI too low to measure in Run 7.

The data in Table I for Runs 2 through 8 demonstrate the effects of DEBE addition, relative to control Run 1, on catalyst activity, polymer MI and HI.

As the concentration of DEBE increased to 15 ppm in Runs 2 through 6, the longer calculated run times necessary to achieve the common 4,000 g polyethylene productivity level are seen to increase from 49 minutes in control Run 1 to 60 to 94 minutes in inventive Runs 2-6. At the same time, polymer MI decreased from about 0.5 for control Run 1 to 0.1 or lower in inventive Runs 2-6. Polymer density was little affected by the presence of DEBE. However, HI increased from 12 for control Run 1 to 19 for inventive Run 4.

In comparing inventive Run 4 wherein 10 ppm DEBE was added, with inventive Runs 5 and 6 wherein 15 ppm DEBE were employed, the substantially lower catalyst productivities obtained in Runs 5 and 6 indicate that too much DEBE was used. Accordingly, with supported chromium oxide catalysts activated at 760° C., the upper limit for DEBE appears to be somewhat greater than 10 ppm but less than 15 ppm, thus about 12-13 ppm, to avoid poisoning of the supported catalyst and reducing catalyst activity to an unacceptably low level.

Inventive Run 7 was made with silica-supported chromium oxide catalyst activated at a higher temperature of 871° C., rather than the activation temperature of 760° C. used in each of Runs 1-6. Thus, when a higher catalyst activation temperature, e.g. 871° C., was used rather than 760°, the productivity results of 4,400 g polyethylene per g solid catalyst in inventive Run 7 show that at least 15 ppm DEBE can be used in ethylene polymerization without serious reduction in catalyst activity. However, when the DEBE level was increased to 21 ppm, a non-functional catalyst apparently resulted. Consequently, with supported catalysts activated at 871° C., the upper limit for DEBE appears to A sample of the supported chromium oxide catalyst, previously activated in dry air at 593° C., was slurried in n-hexane. Sufficient DEBE solution was added at 25° C. to provide 4 weight percent DEBE based on weight of supported catalyst plus DEBE. The solvent was evaporated and a portion of the resulting impregnated catalyst was tested as before in ethylene polymerization at a reaction temperature of 96° C. The impregnated catalyst was not operative. Although both the supported catalyst activation temperature and the polymerization temperature were lower than those employed in Example I, these results indicate that the impregnation technique was not equivalent to using the boron compound as a separately added adjuvant. In other words, the impregnation technique apparently poisons the catalyst, presumably since the entire amount of boron compound immediately contacts all or most of the polymerization sites and thus renders them inactive, though we do not wishh to be bound by theoretical considerations. This result did not occur in Example I in which up to 15 ppm DEBE were employed as a separately added adjuvant, which is equivalent to about 64 weight percent DEBE based on supported catalyst weight plus DEBE.

Example III (Comparative)

A series of polymerization runs was conducted as in Example I at 220° F. (104° C.) and 565 psia by employing portions of the same supported chromium oxide catalyst which had been previously activated at 760° C. in dry air. The organoboron compound adjuvant employed was ethylboron diethoxide (EBDE) added as a 0.1 weight percent solution in mixed n-hexane/n-pentane. The EBDE compound was obtained commercially as a 10 weight percent solution in n-hexane and diluted with n-pentane to the 0.1 weight percent level.

The results obtained are shown in Table II:

TABLE II

Ethylene Polymerization, EBDE Adjuvant

| Run No. | Catalyst Weight mg | EBDE ppm | Ind. Time min. | Run Time, min. actual | Run Time, min. adjusted | Catalyst ivity g/g cat. | MI g/10 min. | Product-Density g/cc | Adjusted HI |
|---|---|---|---|---|---|---|---|---|---|
| 9 | 46.5 | 0 | 33 | 40 | 40 | 4045 | 0.65 | 0.9620 | 11 |
| 10 | 50.0 | 0.9 | 35 | 40 | 37 | 4340 | 0.60 | 0.9624 | 11 |
| 11 | 54.0 | 1.8 | 48 | 42 | 42 | 4020 | 0.45 | 0.9630 | 10 |
| 12 | 57.0 | 3.6 | 102 | 55 | 61 | 3595 | 0.29 | 0.9612 | 13 |

TABLE II-continued

| | | | Ethylene Polymerization, EBDE Adjuvant | | | | | |
|---|---|---|---|---|---|---|---|---|
| Run No. | Catalyst Weight mg | EBDE ppm | Ind. Time min. | Run Time, min. actual | adjusted | Catalyst ivity g/g cat. | MI g/10 min. | Product- Density g/cc | Adjusted HI |
| 13 | 54.0 | 7.2 | 92 | no go[(1)] | — | 0 | — | — |

[(1)]An inoperative catalyst under the conditions employed.

The data shown in Table II indicate that EBDE is a stronger catalyst poison than DEBE, since even at 3.6 ppm EBDE in Run 12, the catalyst activity decreased relative to control Run 9. When EBDE concentration was doubled to 7.2 ppm, an inoperative catalyst resulted. Polymer MI also was decreased by the use of EBDE, similarly to the effect obtained with DEBE. However, in contrast to DEBE which increased the HI of polyethylene, EBDE had relatively little effect on this property.

These results demonstrate that there is little or no advantage to be gained by employing monoalkylboron dialkoxides as reactor adjuvants in the particle form polymerization of ethylene with the silica supported chromium catalysts.

Inspection of the SEC curves shown in FIG. 1 indicates that EBDE has little or no effect on polymer molecular weight or molecular weiht distribution since the curves are similar in appearance.

FIG. 1 shows these SEC curves for polyethylenes prepared with a silica-supported chromium oxide catalyst. Curve C is for a polyethylene prepared from the silica-supported chromium oxide catalyst without adjuvant. Curves A and B are for polyethylene produced under the same conditions using the same supported catalyst, but with two levels of ethyl boron diethoxide (EBDE). No particular effect on molecular weight distribution was observed.

Example IV

A series of ethylene polymerization runs was made with portions of the catalyst used before, previously activated at 760° C. in dry air employing reaction condition set forth in Table I. Several runs also were made with a reactor temperature of 107° C. In this series, several comparison runs were made using as reactor adjuvant, a 1 weight percent solution of triethylborane (TEB) in n-heptane. The invention runs comprised combinations of TEB and DEBE added as reactor adjuvant. The polymerization results are given in Table III:

TABLE III

| | Ethylene Polymerization, DEBE Plus TEB Adjuvant | | | | | | |
|---|---|---|---|---|---|---|---|
| Run No. | Catalyst Weight mg | DEBE ppm | TEB ppm | Ind. Time min. | Run Time, min. actual | adjusted | Catalyst Productivity g/g cat. |
| 14[(a)] | 57.5 | 0 | 6 | 0 | 44 | 47 | 3740 |
| 15[(a)] | 58.5 | 0 | 12 | 14 | 80 | 75 | 4240 |
| 16[(b)] | 56.5 | 3 | 6 | 14 | 66 | 63 | 4210 |
| 17[(b)] | 57.0 | 6 | 3 | 45 | 90 | 84 | 4265 |
| 18[(b)(c)] | 50.5 | 0 | 12 | 12 | 84 | 84 | 4020 |
| 19[(b)(c)] | 60.4 | 6 | 12 | 59 | 75 | 93 | 3230 |

[(a)]Runs 14, 15, and 18 are comparisons.
[(b)]Runs 16, 17, and 19 are runs of the invention.
[(c)]Reactor temperature was 170° C. all other runs at 104° C.

The data shown in Table III demonstrate that the catalyst employed in the presence of TEB or TEB plus DEBE under the reaction conditions used has lowered catalyst activity in the presence of the organoboron compounds. Comparison Run 14 in which 6 ppm TEB was used as reactor adjuvant can be viewed as the reference point. When greater concentrations of TEB alone, or TEB plus DEBE, were present, the catalyst activity was depressed appreciably based on the substantially longer adjusted run times needed to obtain a productivity of 4,000 g polyethylene per g solid catalyst. The polymer properties are shown in Table IV:

TABLE IV

| Polyethylene Properties DEBE Plus TEB Reactor Adjuvant | | | | | | |
|---|---|---|---|---|---|---|
| Run No. | DEBE ppm | TEB ppm | Adjusted MI g/10 min. | Density g/cc | HI | Remarks |
| 14 | 0 | 6 | 0.40 | 0.9610 | 20 | comparison |
| 15 | 0 | 12 | 0.16 | 0.9596 | 24 | comparison |
| 16 | 3 | 6 | 0.05 | 0.9525 | 28 | invention |
| 17 | 6 | 3 | 0.01 | 0.9634 | 30 | invention |
| 18 | 0 | 12 | 1.05 | 0.9604 | 20 | comparison |
| 19 | 6 | 12 | 0.29 | 0.9600 | 28 | invention |

The polymer data given in Table IV for comparison Runs 14, 15, and 18, in which TEB was used as reactor adjuvant, can be compared with polymer data for comparison Run 1 of Table I in which no organoboron compound was present. The results show that density was lowered by the use of TEB, and that the greater the TEB concentration the larger the decrease, at least at a reactor temperature of about 104° C. Both TEB and DEBE appeared to have similar effects on HI at approximately similar concentrations. However, comparison of SEC curves in FIG. 2 demonstrate that DEBE broadens the molecular weight distribution by increasing the amount of high molecular weight polymer produced. TEB, in contrast, tends to increase the amount of low molecular weight polymer.

Figure 2:
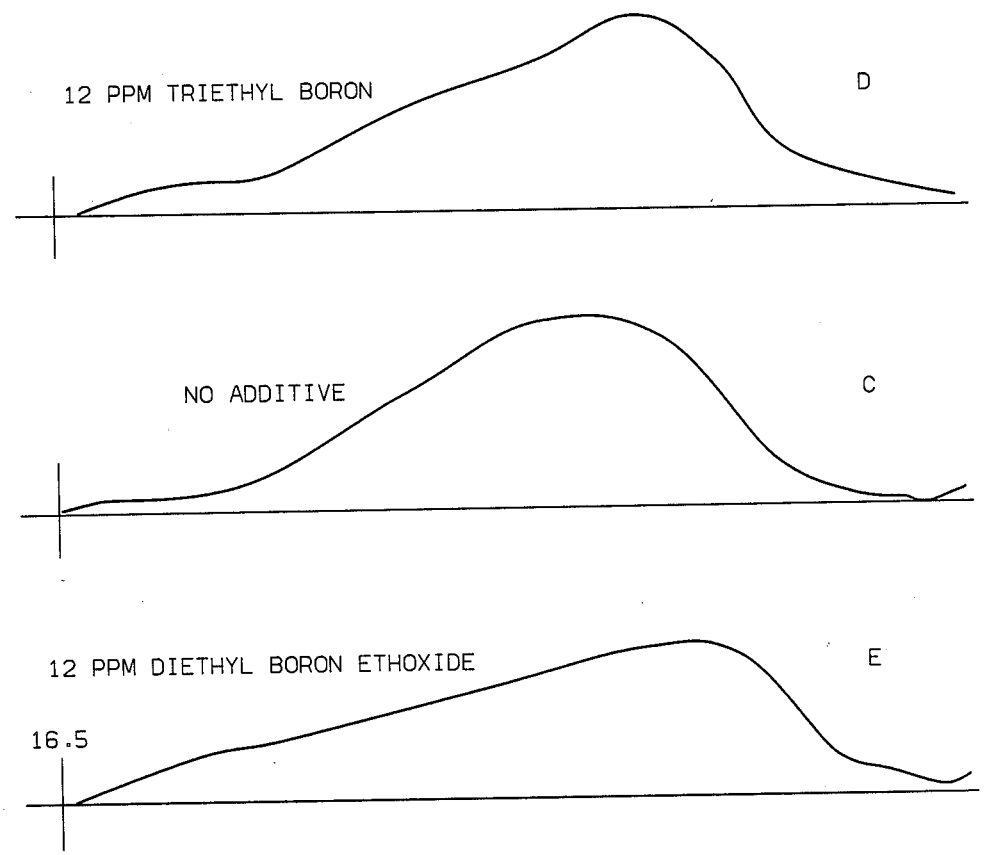
FIG. 2 shows three SEC curves. Curves D and E are for two polyethylenes prepared with the same silica-supported chromium oxide catalyst under the same conditions as in FIG. 1. Curve D is for a polyethylene prepared using triethylboron (TEB). Curve E is a polyethylene using (DEBE) as adjuvant. Curve C is the same comparison as in FIG. 1. Note the clear showing in Curve E of broadened high-molecular weight components resulting from the use of DEBE, showing that DEBE broadens the molecular weight distribution by increasing the amount of high molecular weight polymer produced.

FIG. 2 shows three SEC curves. Curves B and E are for two polyethylenes prepared with the same silica-supported chromium oxide catalyst under the same conditions as in FIG. 1. Curve D is for a polyethylene prepared using Triethylboron (TEB). Curve E is a polyethylene using (DEBE) as adjuvant. Curve C is the same comparison as in FIG. 1. Note the clear showing in Curve E of broadened high-molecular weight components resulting from the use of DEBE, showing that DEBE broadens the molecular weight distribution by increasing the amount of high molecular weight polymer produced.

The results for inventive Runs 16 and 17 show that when DEBE was used with TEB as reaction adjuvant, that normal polymer density of about 0.963 g/cc was obtained at a reactor temperature of 104° C. while the polymer melt index declined and the HIT increased. At a reactor temperature of about 107° C., polymer density was relatively unaffected as shown in comparison of control Run 18 vs. inventive Run 19. However, the addition of 6 ppm DEBE with 12 ppm TEB resulted in a substantial decline in polymer melt index from about 1 to 0.3, while conversely the HI ratio increased substantially from 20 to 28, indicating a broadening of the molecular weight distribution of the polymer. These effects are also demonstrated in the SEC curves shown in FIG. 3.

Figure 3:
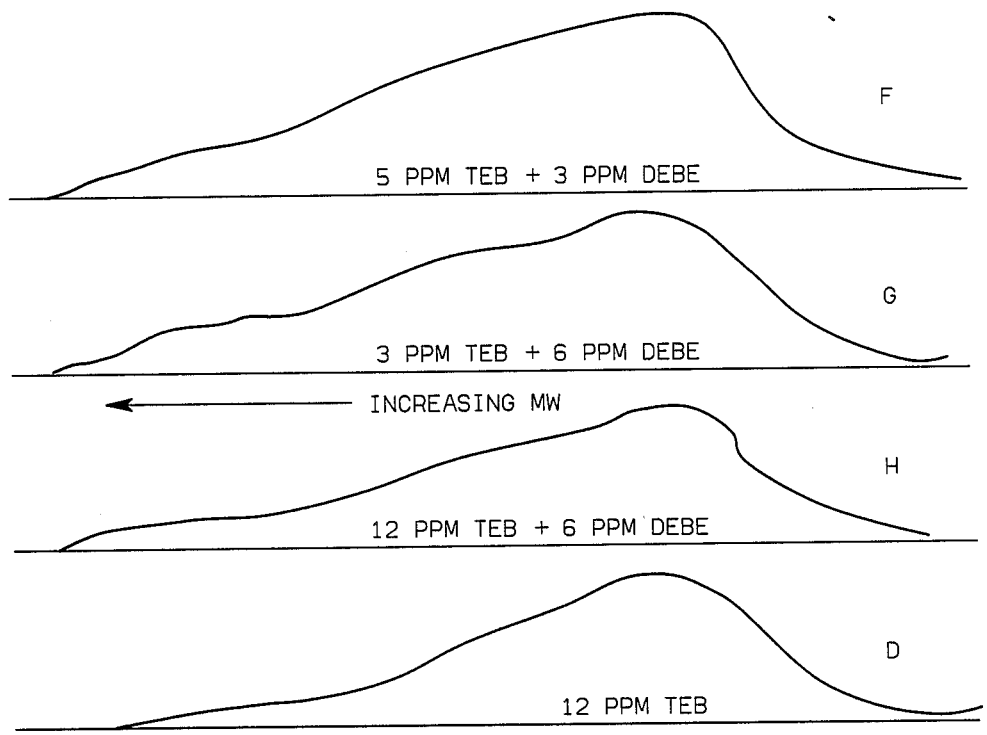
FIG. 3 shows four SEC curves. Curves F, G, and H for polyethylenes again using the same silica-supported chromium oxide catalyst under the same conditions as in FIGS. 1 and 2. Curve D is the same as shown in FIG. 2, employing TEB. Curves F, G, and H show polyethylenes using combinations of TEB and DEBE as adjuvants, each showing some broadening of molecular weight distribution on the high molecular side, particularly Curve G using more DEBE as compared to TEB.

FIG. 3 shows four SEC curves. Curves F, G, and H for polyethylenes again using the same silica-supported chromium oxide catalyst under the same conditions as in FIGS. 1 and 2. Curve D is the same as shown in FIG. 2, employing TEB. Curves F, G, and H show polyethylenes using combinations of TEB and DEBE as adjuvants, each showing some broadening of molecular weight distribution on the high molecular side, particularly Curve G using more DEBE as compared to TEB.

Example V

A catalyst containing about 1 weight percent chromium as chromium(III) nitrate supported on aluminum phosphate having a calculated P/Al atom ratio of about 0.8:1 was made in the manner described in Example III of U.S. Pat. No. 4,364,855 (McDaniel and Johnson). The hydrogel made was washed in water, then washed with isopropyl alcohol to displace the water, dried in a vacuum oven, and heated in a fluidized bed with dry air for 3 hours at 600° C. to produce the activated catalyst.

A series of ethylene polymerization runs was conducted at 220° F. (140° C.) and at 565 psia (3.90 MPa) with individual portions of the catalyst as described in Example I. Where employed, DEBE was supplied to the reactor as a 1 weight solution in a mixture of n-hexane and n-pentane as before. When employed, TEB was supplied to the reactor as a 1 weight percent solution in n-heptane.

In this series of Runs, the productivity results were adjusted to a run time of 60 minutes, based on a linear catalyst activity response. Actual run times of about 50 to 70 minutes were used. The polymerization results are set forth in Table V:

TABLE V

Polyethylene Properties, Cr/AlPO$_4$ Catalyst, DEBE Or TEB Adjuvant

| Run No. | Adjuvant DEBE ppm | TEB ppm | Adjusted Productivity g PE/g cat/hr | MI g/10 min | HLMI g/10 min | HLMI[a] MI | Density g/cc |
|---|---|---|---|---|---|---|---|
| 20 | 0 | 0 | 1725 | 0 | 0.2 | — | 0.9601 |
| 21 | 8 | 0 | 1200 | 0.7 | 99 | 141 | 0.9654 |
| 22 | 0 | 8 | 2135 | 0.8 | 144 | 180 | 0.9700 |

[a]The ratio HLMI/MI, sometimes termed a shear ratio, is used as an indication of molecular weight distribution. The larger the number, the broader is considered the molecular weight distribution.

The data in Table V for Runs 20–22 show that the use of either DEBE or TEB increased polymer density relative to the value of 0.9601 g/cc obtained for the polyethylene of baseline Run 20 made in the absence of an adjuvant. Both DEBE and TEB also increased polymer MI (or HLMI) relative to the smaller values obtained in baseline Run 20. The changes in density and MI for the polymer are opposite to those shown in Table III with the silica-chromium catalyst in combination with either DEBE or TEB.

The high HLMI/MI values of 141 and 180 obtained in Runs 21 and 22 indicate that broadened molecular weight distribution polymers are produced.

The adjusted productivity values obtained also show that DEBE depresses catalyst activity relative to results obtained in its absence. TEB is observed to enhance productivity relative to results obtained in its absence.

The disclosure, including data, has illustrated the value and effectiveness of our invention. The examples, the knowledge and background of the field of the invention and the general principles of chemistry and of other applicable sciences have formed the bases from which the broad descriptions of our invention including the ranges of conditions and the generic groups of operant components have been developed, and formed the bases for our claims here appended.

That which is claimed:

1. A catalyst and boron-component system consisting essentially of effective ratios of:
   (a) a supported chromium oxide catalyst wherein said support is a silica-containing support selected from at least one of the group consisting of silica, silica-alumina, coprecipitated silica-titania, coprecipitated silica-alumina-titania, and mixtures, wherein at least a portion of said chromium is hexavalent, and said catalyst (a) contains about 0.1 to 10 percent by weight chromium; and
   a boron-component selected from the group consisting of (b) and (b)+(c), employing said boron-component in an amount sufficient to give an atom ratio of boron to chromium within the range of about 0.3:1 to 10:1;
   wherein said (b) is a dihydrocarbylboron monohydrocarbyloxide adjuvant R$_2$BOR and (c) is a trihydrocarbylborane coadjuvant represented BR$_3$, wherein each R is independently selected from C$_1$ to C$_{15}$ hydrocarbyl radicals; and said (b)+(c) employs a ratio of R$_2$BOR:BR$_3$ of about 1:4 to 4:1.

2. A catalyst and boron-component system of claim 1 employing said (b) adjuvant.

3. A catalyst and boron-component system according to claim 2 wherein each R is independently selected from C$_1$ to C$_8$ alkyl radicals.

4. A catalyst and boron component system according to claim 3 wherein said R$_2$BOR is selected from the group consisting of dimethylboron ethoxide, diethylboron ethoxide, di-n-octylboron n-butoxide, diphenylboron phenoxide, dicyclohexylboron ethoxide, and dipentadecylboron n-heptyloxide.

5. The catalyst and boron-component system according to claim 4 wherein each R is an ethyl radical.

6. A catalyst and boron-component system according to claim 2 wherein said support is coprecipitated silica-titania.

7. A catalyst and boron-component system according to claim 2 employing said $R_2BOR$ in an amount sufficient to give an atom ratio of boron to chromium within the range of about 0.5:1 to 7:1.

8. A catalyst and boron-component system according to claim 1 wherein said supported chromium oxide catalyst and said boron component are combined in a diluent.

9. A catalyst and boron-component system according to claim 1 employing said (b) plus (c).

10. A catalyst and boron-component system according to claim 9 wherein each R is independently selected from $C_1$ to $C_8$ alkyl radicals.

11. A catalyst and boron-component system according to claim 10 wherein said $R_2BOR$ is selected from the group consisting of dimethylboron ethoxide, diethylboron ethoxide, di-n-octylboron n-butoxide, diphenylboron phenoxide, dicyclohexylboron ethoxide, and dipentadecyboron n-heptyloxide; and wherein said $R_3B$ is selected from the group consisting of trimethylborane, triethylborane, triphenylborane, and tri-t-butylborane.

12. A catalyst and boron-component system according to claim 11 wherein each R is an ethyl radical.

13. A catalyst and boron-component system according to claim 9 wherein said support is coprecipitated silica-titania.

14. A catalyst and boron-component system according to claim 9 employing said $R_2BOR$ in an amount sufficient to give an atom ratio of boron to chromium within the range of 0.5:1 to 7:1.

15. A catalyst and boron-component system according to claim 1 wherein said support contains at least about 80 weight percent silica.

* * * * *